(12) United States Patent
Onsrud

(10) Patent No.: US 12,093,013 B2
(45) Date of Patent: Sep. 17, 2024

(54) MULTI-AXIS COMPUTER NUMERICAL CONTROL MACHINE TOOL WITH INTEGRALLY-CONTROLLED SAW AND METHOD

(71) Applicant: C. R. Onsrud, Inc., Troutman, NC (US)

(72) Inventor: Tom Onsrud, Toutman, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 379 days.

(21) Appl. No.: 16/838,489

(22) Filed: Apr. 2, 2020

(65) Prior Publication Data

US 2021/0232116 A1   Jul. 29, 2021

Related U.S. Application Data

(60) Provisional application No. 62/966,618, filed on Jan. 28, 2020.

(51) Int. Cl.
| | |
|---|---|
| *B27B 5/18* | (2006.01) |
| *B27B 5/10* | (2006.01) |
| *G05B 19/18* | (2006.01) |
| *G05B 19/19* | (2006.01) |

(52) U.S. Cl.
CPC .............. *G05B 19/182* (2013.01); *B27B 5/10* (2013.01); *B27B 5/18* (2013.01); *G05B 19/19* (2013.01); *G05B 2219/45144* (2013.01)

(58) Field of Classification Search
CPC .................. G05B 19/182; G05B 19/19; G05B 2219/451; B27B 5/10; B27B 5/18
See application file for complete search history.

(56) References Cited

U.S. PATENT DOCUMENTS

| | | | | | |
|---|---|---|---|---|---|
| 2,856,672 | A | * | 10/1958 | Gregg ..................... | B27B 13/10 269/48 |
| 3,548,542 | A | * | 12/1970 | Young ...................... | B26D 1/46 83/820 |
| 3,886,424 | A | * | 5/1975 | Hoshina ............... | G05B 19/231 318/630 |
| 5,213,022 | A | * | 5/1993 | Elgan ..................... | B23D 53/04 83/803 |
| 5,771,950 | A | * | 6/1998 | Hardesty ................... | B44B 1/06 144/365 |
| 2003/0110618 | A1 | * | 6/2003 | Magnuson ............. | B23Q 17/22 29/720 |
| 2006/0278057 | A1 | * | 12/2006 | Wuertemberger ......................... | B23D 57/0007 83/651.1 |
| 2007/0234541 | A1 | * | 10/2007 | Feinauer .............. | B23Q 39/028 483/23 |

(Continued)

*Primary Examiner* — Evan H Macfarlane
*Assistant Examiner* — Liang Dong
(74) *Attorney, Agent, or Firm* — Shumaker, Loop & Kendrick, LLP; Patrick B. Horne

(57) ABSTRACT

A CNC machining center that includes a machine base and a machine tool positioned on the base for carrying out a machining operation on a workpiece. A work table is positioned on the base and is adapted for supporting the workpiece and moving the workpiece relative to the machine tool during a machining operation. A saw is positioned above the work table in a longitudinally-offset direction from the machine tool for carrying out a sawing operation on the workpiece. The saw may be a band saw.

30 Claims, 5 Drawing Sheets

(56) References Cited

U.S. PATENT DOCUMENTS

| | | | |
|---|---|---|---|
| 2010/0212465 A1* | 8/2010 | Tillman | B26F 1/3833 83/155.1 |
| 2013/0086801 A1* | 4/2013 | Mimura | B23P 21/00 29/720 |
| 2018/0250781 A1* | 9/2018 | Gauli | B23Q 15/06 |
| 2018/0326590 A1* | 11/2018 | Masuda | B25J 15/04 |
| 2021/0362278 A1* | 11/2021 | Trojanowski, Jr. | B23K 26/0093 |

* cited by examiner

MULTI-AXIS COMPUTER NUMERICAL CONTROL MACHINE TOOL WITH INTEGRALLY-CONTROLLED SAW AND METHOD

PRIORITY CLAIM

This utility patent application claims priority from U.S. Provisional Patent Application No. 62/966,618, filed Jan. 28, 2020, the full contents of which are incorporated by reference into this utility patent application.

TECHNICAL FIELD AND BACKGROUND OF INVENTION

This invention relates to multi-axis computer numerical control (CNC) machines. More specifically, the application relates to a CNC machine that incorporates a machine tool, such as a multi-axis router, Honan integrally-controlled saw, for example, a band saw, that is capable of carrying out certain automated product fabrication functions described below, and methods for carrying out those functions.

Honeycomb materials are one embodiment of the present invention that will now be described more fully with reference to the accompanying drawings, in which some, but not all, embodiments of the invention are shown. The invention may be embodied in many different forms and should not be construed as limited to the embodiments set forth in this application; rather, these embodiments are provided so that this disclosure will satisfy applicable legal requirements. Like numbers refer to like elements throughout.

Routing machines used in industrial applications typically have a work table supported by a base and a tool head assembly supported on a beam. The work table may be moveable with respect to a stationary beam or a moveable beam may be moveable with respect to a stationary work table or both may move relative to each other. Workpieces are typically secured in position on the table by a vacuum, clamp or roller assembly that press the workpiece against the work table and maintain the workpiece in a predetermined location that is programmed into the CNC machine.

Typically, a 3-axis CNC machine is capable of functioning in the standard three axes of motion, which are usually defined in the traditional 3-axis manner by an X-axis, a Y-axis, and a Z-axis. These axes correspond to directions in which the cutting tool of a machine can move. Some advanced machines can move not only linearly in the standard X, Y, and Z axis directions, but can also move rotationally about one or more axes. In such applications, the A-axis typically refers to a rotational axis around the X-axis, the B-axis typically refers to a rotational axis around the Y-axis, and the C-axis typically refers to a rotational axis around the Z-axis. Generally, a positive rotation is defined as a counterclockwise (CCW) rotation looking from positive towards negative, for example in the A-axis, looking from X positive towards X negative.

On a "5-axis" machine, the cutting tool moves across the standard X, Y, and a Z linear axes and also moves rotationally around two rotational axes such as those explained above.

In certain applications it is desirable to utilize the multi-axis features of the CNC machine on workpieces being fabricated that also are best shaped in certain orientations by a straight line cut. In many instances these straight line cuts are best carried out by a saw, for example a circular or band saw. Presently, workpieces are typically fabricated to a certain level of shaping, for example, on a band saw, and then transferred to another machine for further fabrication steps. More generally, workpieces requiring both curvilinear and straight cuts are often machined on separate machines, requiring removal of a workpiece from one machine and transfer to another machine, requiring another setup process to insure that the workpiece is accurately formed. This involves manual steps and transport of workpieces that results in wasted time and possible damage to the workpiece during transit from one machine to another machine.

Honeycomb structures are one example out of many possible examples of materials that may be usefully machined on the CNC machine disclosed and claimed in this application. Honeycomb structures are natural or man-made structures that have the geometry of a honeycomb to allow the minimization of the amount of used material to reach minimal weight and minimal material cost. The geometry of honeycomb structures can vary widely but the common feature of all such structures is an array of hollow cells formed between thin vertical walls. The cells are often columnar and hexagonal in shape. A honeycomb-shaped structure provides a material with minimal density and relatively high out-of-plane compression and out-of-plane shear properties.

Man-made honeycomb structural materials are commonly made by layering a honeycomb material between two thin layers that provide strength in tension. This structure forms a plate-like assembly. Honeycomb materials are widely used where flat or slightly curved surfaces are needed and high specific strength is important. Honeycomb structures are widely used in the aerospace industry for this reason, and honeycomb materials in aluminum, fiberglass and advanced composite materials have been used in aircraft and rockets since the 1950s. They can also be found in many other fields, from packaging materials in the form of paper-based honeycomb cardboard, to sporting goods such as skis and snowboards.

In the aerospace industry, for example, the interiors of aircraft are made of honeycomb panels, i.e., sandwich panels with a honeycomb core. These types of interior honeycomb panels are predominantly used in toilet walls, side panels, galley structures and floor panels inside the aircraft and in structural exterior components such as flight control surfaces. Since honeycomb panels are further processed, i.e. cut to size or fitted with inserts for mounting other components, the honeycomb structure requires both a high degree of stability and conformational accuracy and consistency.

CNC machines are ideal for fabricating parts, such as honeycomb structures, made of fragile material. Because a honeycomb structure is hollow, it cannot be held stationary with vacuum, as is frequently the case on CNC machines. Similarly, honeycomb parts often cannot be clamped because the necessary clamping force would crush the material.

Therefore, the invention of this application is described with reference to honeycomb structures but as noted above, other structures, for example, various foam-based materials are equally applicable to this invention.

In one manufacturing process the appropriate thickness for the part to be fabricated is cut off of a large block of the material, for example, honeycomb structure. The sawn part is then potted by saturating the part with a hardenable material that fills the voids in the honeycomb and hardens. In some instances a technique is used whereby the potting process is temporary, i.e., honeycomb is temporarily potted with a material that liquefies when heated and which is introduced into the voids in the honeycomb structure where it cools and hardens. In this condition the honeycomb is air-impervious and solid enough to be held by vacuum or clamped and thus shaped. After part formation is completed, the part is heated and the potting material melts sufficiently to be extracted from the honeycomb structure, leaving a very light-weight structural part for further manufacturing processes.

Other processes can be used, such as mounting the honeycomb to a skin to hold the block in a stationary position for machining.

In accordance with the discussion below, a multi-axis CNC machining center is disclosed and explained that permits both axis-based and linear-based cutting to take place on a single CNC machine, eliminating the need to move the part from one machine to another machine during fabrication.

SUMMARY OF THE INVENTION

It is therefore an object of the present invention to provide a machining center that incorporates a multi-axis machine tool and a saw into a single machine under unitary CNC control.

It is another object to provide a process of operating a multi-axis machine tool and a saw in a single machine under unitary CNC control to permit successive process steps on a single workpiece.

These and other objects and advantages of the invention are achieved by providing a CNC machining center that includes a machine base, a machine tool positioned on the base for carrying out a machining operation on a workpiece, a work table positioned on the base and adapted for supporting the workpiece as the workpiece moves relative to the machine tool, and a saw positioned above the work table in a linearly offset position relative to the machine tool for carrying out a sawing operation on the workpiece. A programmable digital computer and computer interface is provided for controlling the operation of the machine tool, work table and saw of the machining center.

According to another aspect of the invention, the saw includes a continuous band having saw teeth positioned for sawing rotation on two spaced-part drive and driven band saw wheels.

According to another aspect of the invention, the band saw wheels are positioned in respective housings that are positioned outboard of opposing sides of the work table.

According to another aspect of the invention, the saw is positioned above the work table in a downstream orientation relative to the machine tool whereby the machine tool is adapted to carry out the machining operation on the workpiece upstream of the sawing operation.

According to another aspect of the invention, the work table is mounted on the base for movement on at least one longitudinally-extending trackway relative to the machine tool and the saw.

According to another aspect of the invention, the saw is positioned on a laterally-extending gantry mounted on legs that straddle the at least one trackway for moving the saw vertically relative to the work table.

According to another aspect of the invention, the saw is longitudinally stationary relative to the work table, and the vertical movement relative to the work table is under the control of the computer for permitting the blade to perform horizontal cuts on the workpiece positioned on the work table as it passes under the saw gantry.

According to another aspect of the invention, a tool head gantry is supported by a pair of laterally-spaced legs that straddle the work table, and a beam section on which is mounted a tool head assembly is mounted for lateral movement on a horizontal rail supported by the beam section and mounted for vertical movement on a vertical rail supported by the beam section.

According to another aspect of the invention, an outfeed table is positioned linearly downstream of the work table and the outfeed table has a length that is twice a length of the work table whereby the machine tool is adapted to reach all points on the workpiece and subsequently, for the saw to fully sever a horizontal portion of the workpiece.

According to another aspect of the invention, the work table has a length of about 11 ft. (3.3 m) and the outfeed table having a length of about 23 ft. (7 m).

According to another aspect of the invention, a method of machining a workpiece under the control of a CNC machining center includes the steps of providing a machine base, a machine tool positioned on the base for carrying out a machining operation on a workpiece, a work table positioned on the base and adapted for supporting the workpiece as the workpiece moves relative to the machine too, a saw positioned above the work table in a linearly offset position relative to the machine tool for carrying out a sawing operation on the workpiece, and a programmable digital computer and computer interface for controlling the operation of the machine tool, work table and saw of the machining center. A workpiece is positioned in a stationary condition on the work table, the workpiece and the machine tool are moved relative to each other to perform a machining step on the workpiece under the control of the computer, and the workpiece and the saw are moved relative to each other to perform a sawing step on the workpiece under the control of the computer.

According to another aspect of the invention, the method includes the step of maintaining the workpiece stationary on the work table and moving work table relative to the machine tool and saw.

According to another aspect of the invention, the method includes the steps of performing the machining step upstream of the saw; moving the workpiece downstream to the saw and performing the sawing step subsequently to and downstream from the machining step.

According to another aspect of the invention, the method includes the step of providing an outfeed table positioned linearly downstream of the work table for supporting the workpiece during the sawing step.

According to another aspect of the invention, the outfeed table has a length that is about twice a length of the work table whereby the machine tool is adapted to reach all points on the workpiece and subsequently, for the saw to fully sever a horizontal portion of the workpiece.

According to another aspect of the invention, the work table has a length of about 11 ft. (3.3 m) and the outfeed table having a length of about 23 ft. (7 m).

According to another aspect of the invention, the workpiece comprises a material having a honeycomb structure.

According to another aspect of the invention, the computer is programmed to carry out the steps b, c and d sequentially and without human intervention.

According to another aspect of the invention, the saw is a band saw characterized by including a continuous band having saw teeth positioned for sawing rotation on two spaced-part drive and driven band saw wheels.

According to another aspect of the invention, the band saw wheels are positioned in respective housings that are positioned vertically above and outboard of opposing sides of the work table, the band saw adapted for making both vertical sawing cuts and horizontal sawing cuts on the workpiece.

According to another aspect of the invention, a method of machining a workpiece under the control of a CNC machining center is provided and includes the steps of positioning a multi-axis machine tool on a base, the multi-axis machine tool being capable of carrying out a machining operation on a workpiece. A workpiece is positioned in a stationary condition on a work table positioned on the base, the work table supporting the workpiece as the workpiece moves relative to the multi-axis machine tool. The workpiece and the multi-axis machine tool are moved relative to each other to perform a machining step on the workpiece under the control of a programmable digital computer. A saw is positioned above the work table in a linearly offset position relative to the machine tool, the saw being capable of carrying out a sawing operation on the workpiece. The workpiece and the saw are moved relative to each other to perform a sawing step on the workpiece under the control of the programmable digital computer to sever a topmost layer of the workpiece from an underlying layer of the workpiece.

BRIEF DESCRIPTION OF THE DRAWINGS

The present invention is best understood when the following detailed description of the invention is read with reference to the accompanying drawings, in which.

DETAILED DESCRIPTION OF THE PREFERRED EMBODIMENT

Figure 1:
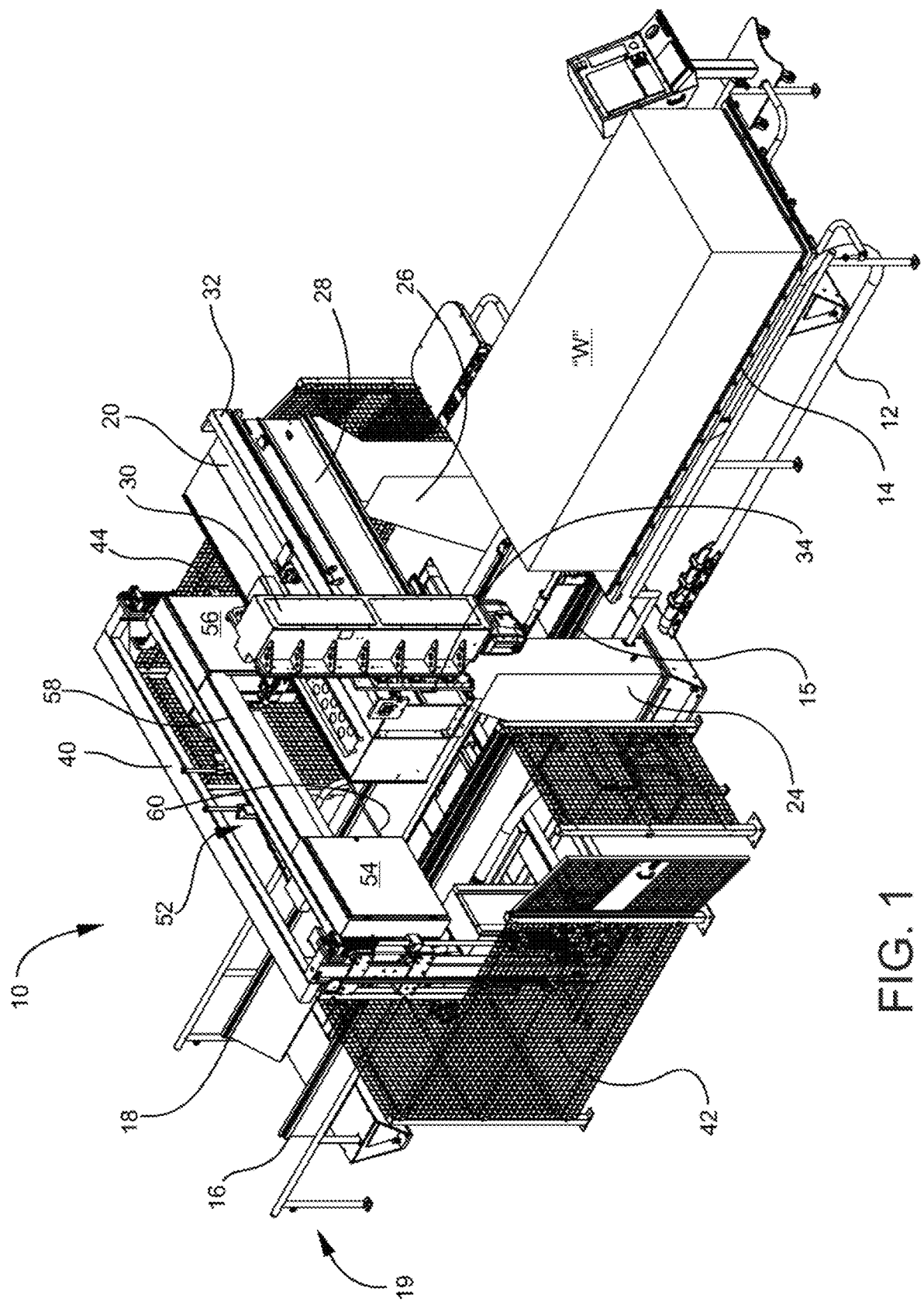
FIG. 1 is a top perspective view of a CNC machining center according to one preferred embodiment of the invention.
Figure 2:
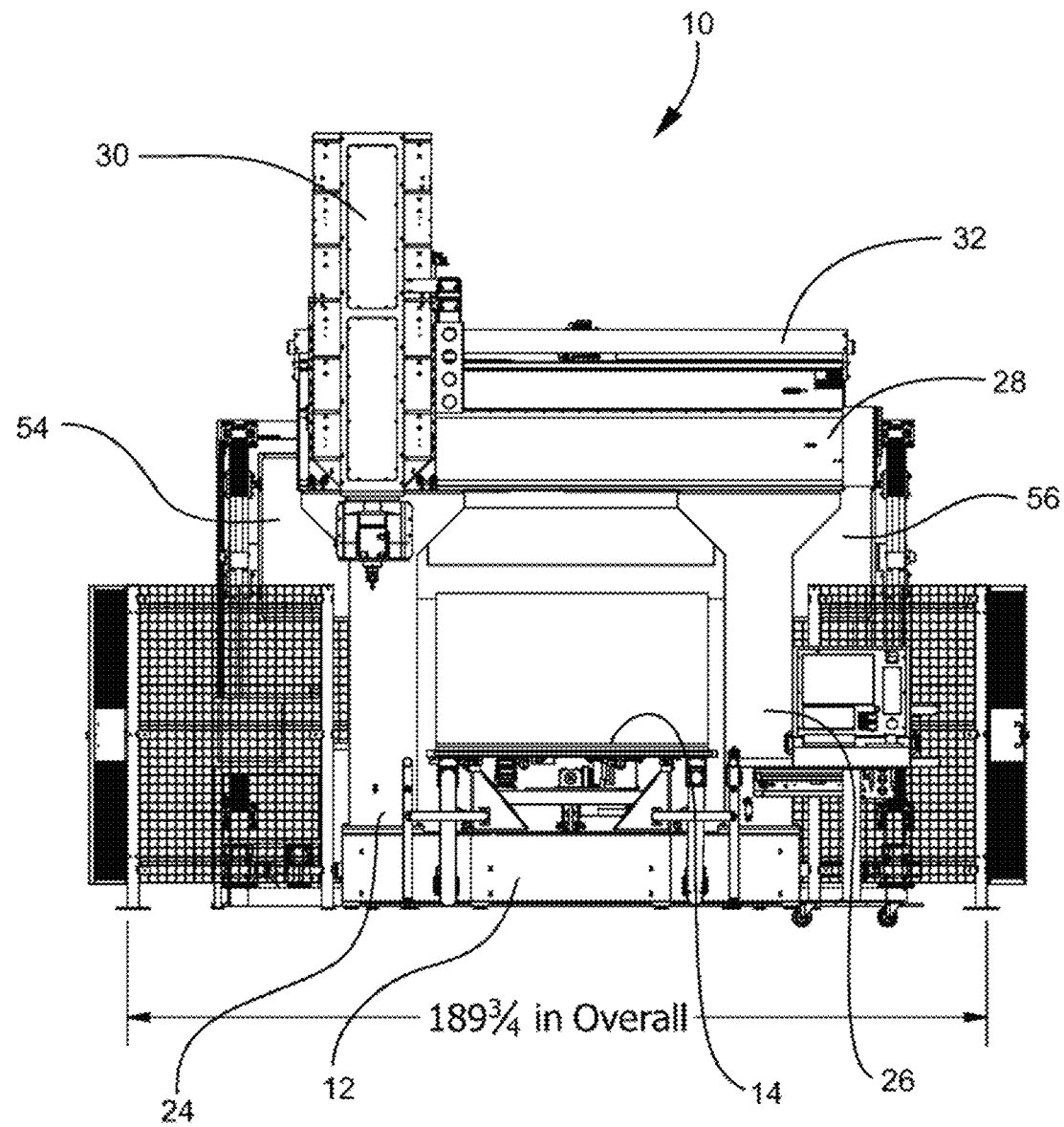
FIG. 2 is a front elevation of the machining center of FIG. 1.
Figure 3:
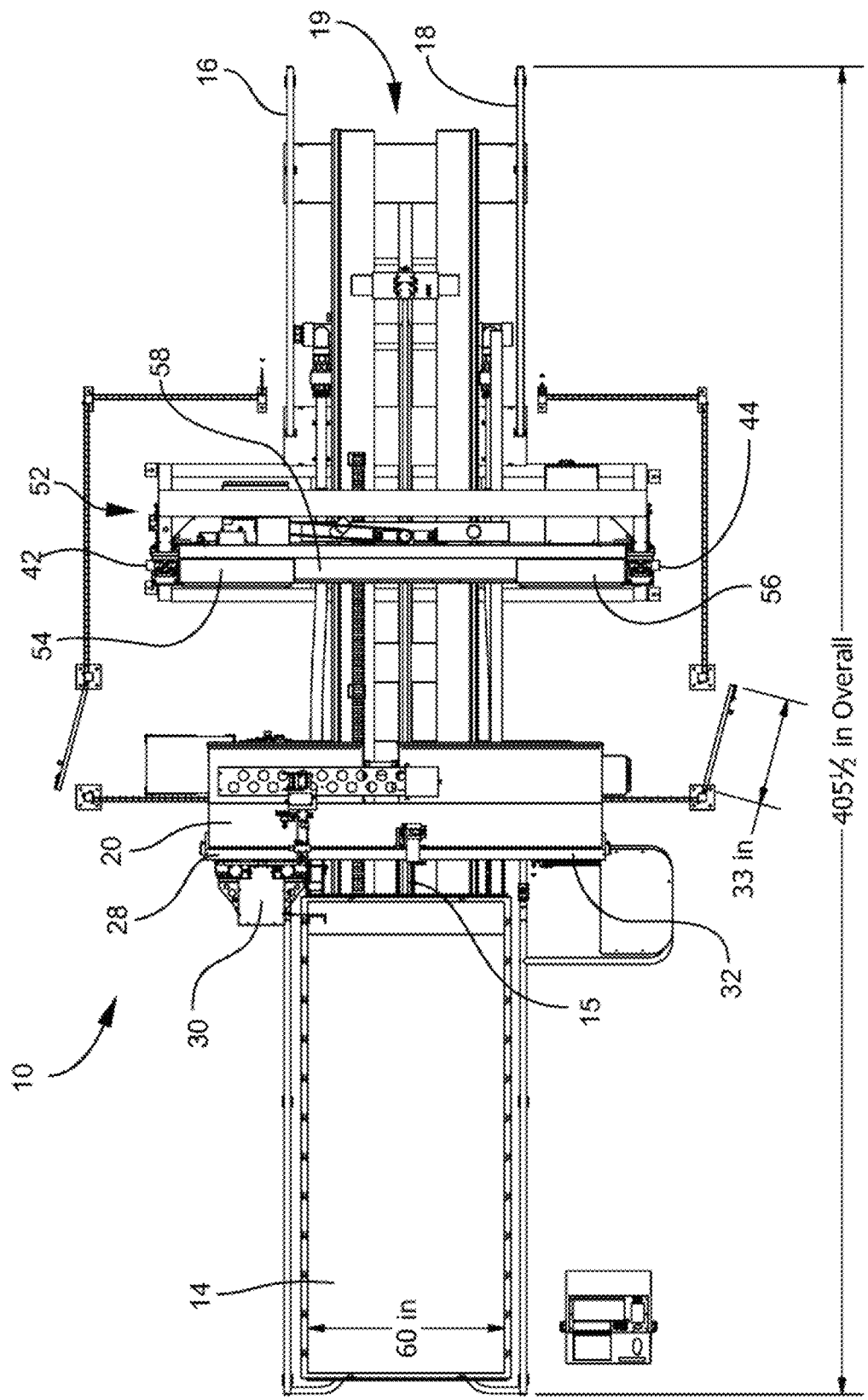
FIG. 3 is a top plan view of the machining center of FIG. 1.
Figure 4:
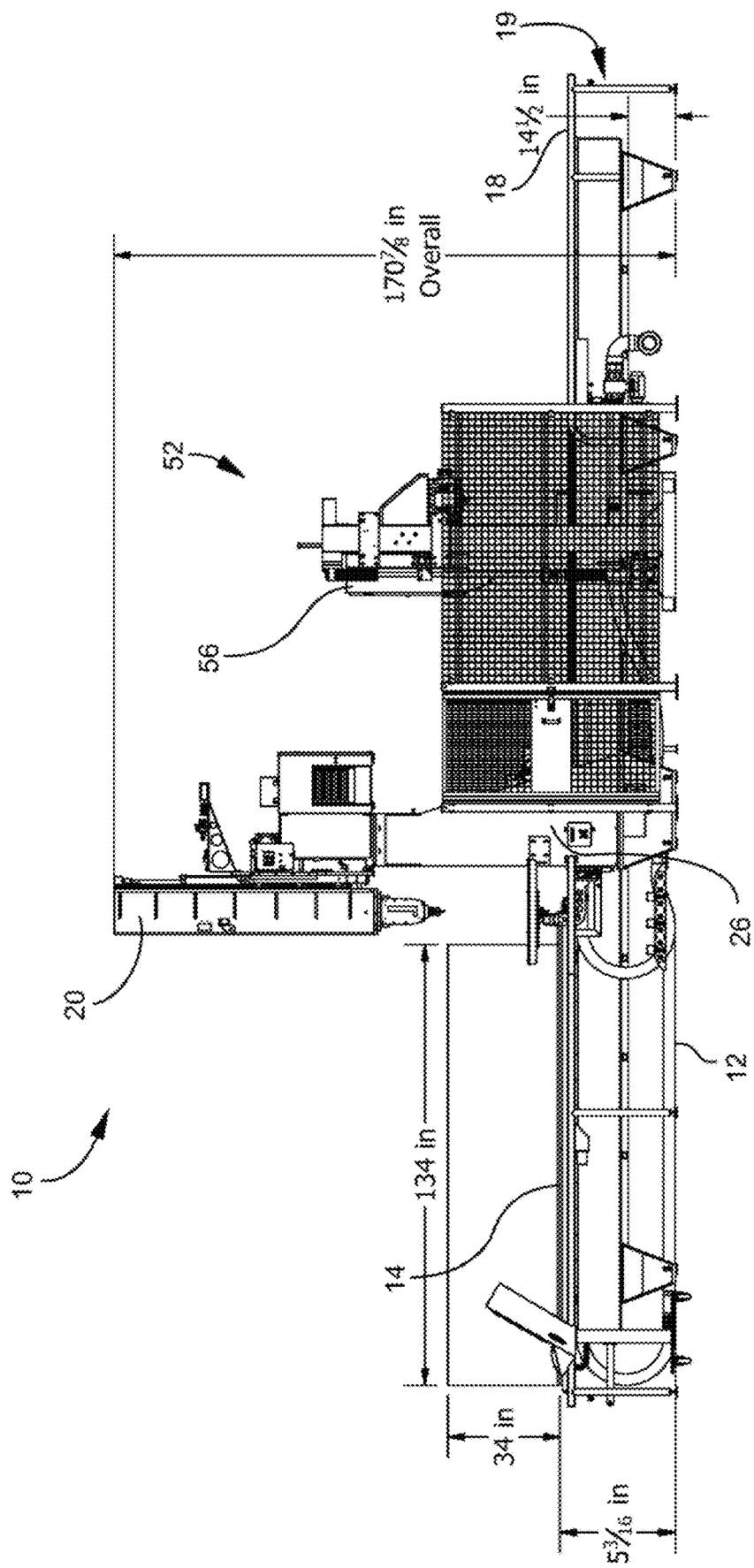
FIG. 4 is a side elevation of the machining center of FIG. 1.
Figure 5:
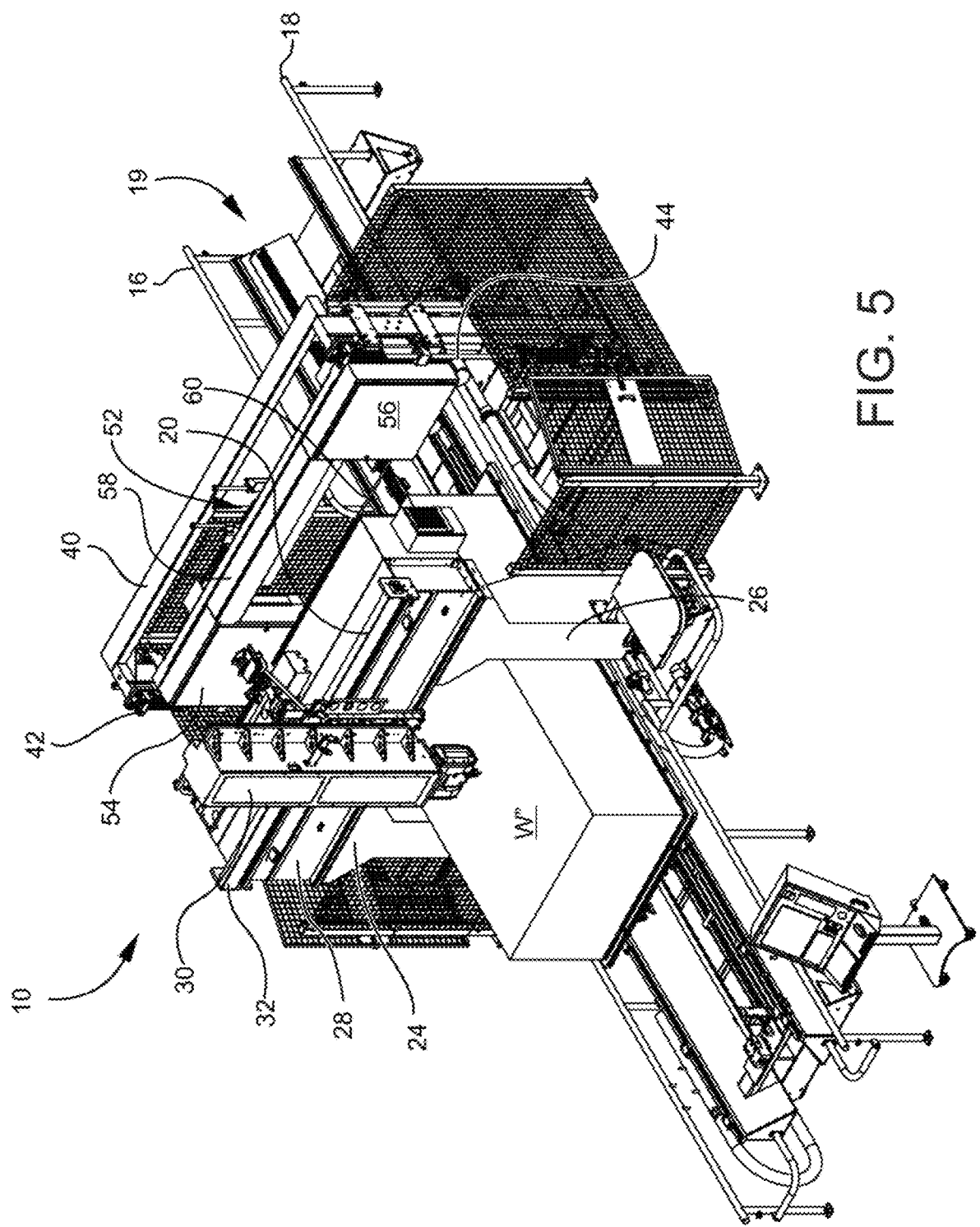
FIG. 5 is a top perspective view of the machining center of FIG. 1 viewed from the output end, with a workpiece in position beneath the machine tool head.

Referring now to FIGS. 1-5 of the drawings, a CNC machining center 10 is shown. The machining center 10 includes a base 12 supporting a work table 14. A pair of laterally-spaced trackways 16 and 18 is mounted on opposing sides of and parallel to a longitudinal axis of the base 12 and form an elongated outfeed table 19. As illustrated, machining center 10 also includes a tool head gantry 20 supported by a pair of laterally-spaced legs 24 and 26 that straddle the work table 14 and the trackways 16, 18.

The tool head gantry 20 supports a beam section 28 on which is mounted a tool head assembly 30, for example a 3-axis or 5-axis tool head assembly. The tool head assembly 30 moves laterally on a horizontal rail 32 supported by the beam section 28. The tool head assembly 30 is mounted for vertical movement on a vertical rail 34. The work table 14 is mounted on a chain drive 15 that moves the work table 14 longitudinally along the trackways 16, 18 in relation to the tool head assembly 30 to achieve the desired machining steps.

The machining center 10 includes a laterally-extending band saw gantry 40 mounted on legs 42, 44 that straddle the trackways 16, 18. The band saw gantry 40 mounts a band saw 52 that extends laterally across the machining center 10.

The band saw 52 includes drive and driven band saw wheels 53, 55 positioned in protective housings 54, 56, respectively. A top blade guard 58 connects the housings 54, 56 for movement of the blade 60 laterally and horizontally across the width of the machining center 10. The band saw 52 is longitudinally stationary, and its vertical movement permits the blade 60 to perform horizontal cuts on a workpiece as it passes under the band saw gantry 50. Other positions and orientations of the band saw 52 may be alternatively adopted and used.

As described above and by way of example only, one specific use of the machining center 10 is machining honeycomb materials. As shown in FIG. 1, a workpiece "W" in the form of a large block of honeycomb, for example, 4-5 ft. (1.2-1.5 m) wide, by 8-10 ft. (2.4-3 m long), by 3 ft. to 4 ft. (0.9-1.2 m thick) is placed on the work table 14. A workpiece this large may be held to the work table 14 by its own weight, stabilized by toe clamps or some similar hold down device. The tool head assembly 30 machines the top of the workpiece "W" into the desired shaped part or parts while still integral with the workpiece "W". The tool head assembly 30 may rout a variety of channels in the workpiece "W", including tapers, chamfers and undercut areas down into the workpiece "W".

Then, the workpiece "W" is moved on the work table 14 downstream to the band saw gantry 40 and the band saw 52 performs a computer-controlled horizontal cut that separates the top machined part from the "parent" workpiece "W." The workpiece "W" can then be removed and transported to another location for further fabrication. This process step can be repeated, with the work table 14 being moved upstream, the band saw indexed vertically downwardly, and each pass of the workpiece under the band saw 52 removing the top machined part from the "parent" workpiece "W", the depth of which diminishes with each pass.

To accomplish this, the outfeed portion of the work table 14 is significantly longer than in known CNC machining centers so that the full extent of the workpiece "W" can pass under the band saw 52. As one example, the overall length of the work table 14 and the outfeed table 19 may be approximately 34 ft. (10 m). To fully accommodate the necessity of the tool head assembly 30 to reach all points on the workpiece "W", and subsequently, for the band saw 52 to fully sever a horizontal layer of the workpiece "W", a work table 14 having a length of approximately 11 ft. (3.3 m) and the outfeed table 19 having a length of approximately 23 ft. (7 m) is sufficient to process a block of honeycomb 4-5 ft. (1.2-1.5 m) wide, by 8-10 ft. (2.4-3 m long), by 3 ft. to 4 ft. (0.9-1.2 m thick), as referenced above.

The machining center is controlled by a programmable digital computer 70 having, for example, a monitor 72 mounted on a portable workstation 74.

Another use of the machining center 10 includes utilizing a honeycomb material that has been potted to form a structural material. The potting process may be a permanent process that results in a honeycomb structure filled with a cured, hardened material such as an epoxy resin, urethane or other potting material. The potting process may also be a temporary process described above where the potting material is infused into the honeycomb to stabilize and strengthen the honeycomb during machining with the potting material thereafter being extracted from the honeycomb by, for example, heat.

The machining center 10 is also suitable for machining and sawing workpieces not having a honeycomb structure.

A CNC machining center that incorporates both a machine tool head and a band saw according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A CNC machining center, comprising:
   a machine base;
   a multi-axis machine tool positioned on the machine base for carrying out a machining operation on a workpiece, wherein the multi-axis machine tool is capable of moving in at least X, Y, and Z axis directions;
   a work table positioned on a linearly-positioned drive supported by the machine base and adapted for supporting the workpiece as the workpiece moves relative to the multi-axis machine tool;
   a saw positioned on the machine base and positioned above the work table in a linearly offset position relative to the multi-axis machine tool for carrying out a sawing operation on the workpiece after the machining operation; and
   a programmable digital computer and computer interface for controlling the operation of the multi-axis machine tool, work table, and saw of the machining center;
   wherein the CNC machining center is configured to:
   a. move the workpiece and the multi-axis machine tool relative to each other to perform a machining step on the workpiece under the control of the programmable digital computer, the machining step comprising moving the workpiece to route one or more channels into a topmost layer of the workpiece by:
      i. moving the linearly-positioned drive to position the work table supporting the workpiece below the multi-axis machine tool;
      ii. moving the multi-axis machine tool laterally along a horizontal rail that is elevated above the work table to laterally position the multi-axis machine tool as needed during the machining step; and
      iii. moving the multi-axis machine tool vertically along a vertical rail to vertically position the multi-axis machine tool as needed during the machining step, wherein the horizontal rail and vertical rail are supported by the machine base;
   b. move the workpiece and the saw relative to each other to perform a sawing step on the workpiece under the control of the programmable digital computer to sever the topmost layer of the workpiece from a remainder of the workpiece, the sawing step performing a horizontal cut across the workpiece to sever the topmost layer as the work table passes under the saw that is suspended above the work table by one or more legs that are supported by the machine base;
   c. move the workpiece to an outfeed table positioned linearly downstream to facilitate removal of the severed topmost layer of the workpiece from the remainder of the workpiece; and
   d. move, after removal of the severed topmost layer, the remainder of the workpiece and the multi-axis machine tool relative to each other to perform another machining step on the remainder of the workpiece under the control of the programmable digital computer.

2. The CNC machining center according to claim 1, wherein the saw includes a continuous band having saw teeth positioned for sawing rotation on two spaced-part drive and driven band saw wheels.

3. The CNC machining center according to claim 2, wherein the band saw wheels are positioned in respective housings that are positioned outboard of opposing sides of the work table.

4. The CNC machining center according to claim 2, wherein the saw is positioned above the work table in a downstream orientation relative to the multi-axis machine tool whereby the multi-axis machine tool is adapted to carry out the machining operation on the workpiece upstream of the sawing operation.

5. The CNC machining center according to claim 4, wherein the work table is mounted on the base for movement on at least one longitudinally-extending trackway relative to the multi-axis machine tool and the saw.

6. The CNC machining center according to claim 4, wherein the saw is positioned on a laterally-extending gantry mounted on legs that straddle the at least one trackway for moving the saw vertically relative to the work table.

7. The CNC machining center according to claim 4, wherein the saw is longitudinally stationary relative to the work table and the vertical movement relative to the work table is under the control of the computer for permitting the blade to perform horizontal cuts on the workpiece positioned on the work table as it passes under the saw gantry.

8. The CNC machining center according to claim 4, including a tool head gantry supported by a pair of laterally-spaced legs that straddle the work table, a beam section on which is mounted a tool head assembly mounted for lateral movement on a horizontal rail supported by the beam section and mounted for vertical movement on a vertical rail supported by the beam section.

9. The CNC machining center according to claim 1, wherein the linearly-positioned drive is a chain drive, and wherein the outfeed table has a length that is twice a length of the work table whereby the multi-axis machine tool is adapted to reach all points on the workpiece and subsequently, for the saw to fully sever a full extent of the topmost layer of the workpiece.

10. The CNC machining center according to claim 9, wherein the length of the work table is about 11 ft. (3.3 m) and the length of the outfeed table is about 23 ft. (7 m), and wherein the workpiece comprises a block of material between 4-5 ft. (1.2-1.5 m) wide, 8-10 ft. (2.4-3 m) long, with an initial height, prior to removal of the topmost layer, of 3-4 ft. (0.9-1.2 m) thick.

11. A method of machining a workpiece, comprising the steps of providing:
   a. providing a CNC machining center comprising a machine base; a multi-axis machine tool positioned on the machine base for carrying out a machining operation on the workpiece, wherein the multi-axis machine tool is capable of moving in at least X, Y, and Z axis directions; a work table positioned on a linearly-positioned drive supported by the machine base and adapted for supporting the workpiece as the workpiece moves relative to the multi-axis machine tool; a saw positioned above the work table in a linearly offset position relative to the multi-axis machine tool for carrying out a sawing operation on the workpiece after the machining operation; and a programmable digital computer and computer interface for controlling the operation of the multi-axis machine tool, the work table, and the saw of the machining center;

b. positioning a workpiece in a stationary condition on the work table;

c. moving the workpiece and the multi-axis machine tool relative to each other to perform a machining step on the workpiece under a control of the computer, the machining step comprising moving the workpiece to route one or more channels into a topmost layer of the workpiece by:

i. moving the linearly-positioned drive to position the work table supporting the workpiece below the multi-axis machine tool;

ii. moving the multi-axis machine tool laterally along a horizontal rail that is elevated above the work table to laterally position the multi-axis machine tool as needed during the machining step; and iii. moving the multi-axis machine tool vertically along a vertical rail to vertically position the multi-axis machine tool as needed during the machining step, wherein the horizontal rail and vertical rail are supported by the machine base;

d. moving the workpiece and the saw relative to each other to perform a sawing step on the workpiece under the control of the computer to sever the topmost layer of the workpiece from a remainder of the workpiece, the sawing step performing a horizontal cut across the workpiece to sever the topmost layer as the work table passes under the saw that is suspended above the work table by one or more legs that are supported by the machine base;

e. moving the workpiece to an outfeed table positioned linearly downstream to facilitate removal of the severed topmost layer of the workpiece from the remainder of the workpiece; and f. moving, after removal of the severed topmost layer, the remainder of the workpiece and the multi-axis machine tool relative to each other to perform another machining step on the remainder of the workpiece under the control of the computer.

12. The method of machining a workpiece according to claim 11, and including the step of maintaining the workpiece stationary on the work table and moving work table relative to the multi-axis machine tool and saw.

13. The method of machining a workpiece according to claim 11, and including the steps of performing the machining step upstream of the saw, moving the workpiece downstream to the saw, and performing the sawing step subsequently to and downstream from the machining step.

14. The method of machining a workpiece according to claim 11, including the step of providing the outfeed table to be positioned linearly downstream of the work table for supporting the workpiece during the sawing step.

15. The method of machining a workpiece according to claim 14, wherein the outfeed table has a length that is twice a length of the work table whereby the multi-axis machine tool is adapted to reach all points on the workpiece and subsequently, for the saw to fully sever a horizontal portion of the workpiece.

16. The method of machining a workpiece according to claim 14, wherein the work table has a length of about 11 ft. (3.3 m) and the outfeed table has a length of about 23 ft. (7 m).

17. The method of machining a workpiece according to claim 11, wherein the workpiece comprises a material having a honeycomb structure.

18. The method of machining a workpiece according to claim 11, wherein the computer is programmed to carry out the steps b, c and d sequentially and without human intervention.

19. The method of machining a workpiece according to claim 11, and including the steps of repetitively moving the remainder of the workpiece and the saw relative to each other to perform another sawing step on the remainder of the workpiece under the control of the computer to sever successive topmost layers of the workpiece from the remainder of the workpiece, and removing the severed successive topmost layers of the workpiece from the remainder of the workpiece.

20. The method of machining a workpiece according to claim 19, wherein drive and driven saw wheels are positioned in respective housings that are positioned vertically above and outboard of opposing sides of the work table, the saw being adapted for making both vertical sawing cuts and horizontal sawing cuts on the workpiece.

21. A method of machining a workpiece, comprising the steps of:

a. providing a CNC machining center comprising a multi-axis machine tool positioned on a base, a saw positioned on the base, and a programmable digital computer in communication with the multi-axis machine tool and the saw, wherein the multi-axis machine tool is capable of carrying out a machining operation on a workpiece and moving in at least X, Y, and Z axis directions, and wherein the saw is in a linearly offset position relative to the multi-axis machine tool and capable of carrying out a sawing operation on the workpiece after the machining operation;

b. positioning a workpiece in a stationary condition on a work table positioned on the base, the work table supporting the workpiece as the workpiece moves relative to the multi-axis machine tool;

c. moving the workpiece and the multi-axis machine tool relative to each other to perform a machining step on the workpiece under a control of the programmable digital computer, the machining step moving a linearly-positioned drive to position the work table supporting the workpiece below the multi-axis machine tool, moving the multi-axis machine tool along a horizontal rail for lateral movement to laterally position the multi-axis machine tool as needed during the machining step, and moving the multi-axis machine tool vertically along a vertical rail for vertical movement to vertically position the multi-axis machine tool as needed during the machining step;

d. moving the workpiece and the saw relative to each other to perform a sawing step on the workpiece under the control of the programmable digital computer to sever a topmost layer of the workpiece from a remainder of the workpiece;

e. removing the severed topmost layer of the workpiece from the remainder of the workpiece;

f. moving, after removal of the severed topmost layer, the remainder of the workpiece and the multi-axis machine tool relative to each other to perform another machining step on the remainder of the workpiece under the control of the programmable digital computer; and g. repeating steps d, e, and f sequentially until the machining of an entirety of the workpiece is complete.

22. The method according to claim 21, further including the steps of maintaining the workpiece stationary on the work table and moving the work table relative to the multi-axis machine tool and saw.

23. The method according to claim 21, further including the steps of performing the machining step upstream of the saw, moving the workpiece downstream to the saw, and performing the sawing step subsequently to and downstream from the machining step.

24. The method according to claim 21, further including the step of providing an outfeed table positioned linearly downstream of the work table for supporting the workpiece during the sawing step.

25. The method according to claim 24, wherein the outfeed table has a length that is twice a length of the work table whereby the multi-axis machine tool is adapted to reach all points on the workpiece and subsequently, for the saw to fully sever a horizontal portion of the workpiece.

26. The method according to claim 24, wherein the work table has a length of about 11 ft. (3.3 m) and the outfeed table has a length of about 23 ft. (7 m).

27. The method according to claim 21, wherein the workpiece comprises a material having a honeycomb structure.

28. The method according to claim 21, wherein the computer is programmed to carry out the steps b, c and d sequentially and without human intervention.

29. The method according to claim 21, further including the step of repetitively moving the remainder of the workpiece and the saw relative to each other to perform a sawing step on the remainder of the workpiece under the control of the computer to sever successive topmost layers of the workpiece from the remainder of the workpiece, and removing the severed successive topmost layers of the workpiece from the remainder of the workpiece.

30. The method according to claim 29, wherein drive and driven saw wheels are positioned in respective housings that are positioned vertically above and outboard of opposing sides of the work table, and the saw is adapted for making both vertical sawing cuts and horizontal sawing cuts on the workpiece.

* * * * *